United States Patent [19]

Mohan et al.

[11] Patent Number: 5,548,165
[45] Date of Patent: Aug. 20, 1996

[54] HYBRID FILTER FOR REDUCING DISTORTION IN A POWER SYSTEM

[75] Inventors: Ned Mohan, St. Paul; Mukul Rastogi, Minneapolis, both of Minn.

[73] Assignee: Regents of The University of Minnesota, Minneapolis, Minn.

[21] Appl. No.: 276,543

[22] Filed: Jul. 18, 1994

[51] Int. Cl.$^6$ ............................ H02J 1/02; H03H 7/12
[52] U.S. Cl. ........................ 307/36; 333/167; 333/181; 363/39
[58] Field of Search ...................... 307/36, 105; 333/166, 333/167, 181

[56] References Cited

U.S. PATENT DOCUMENTS

| | | | |
|---|---|---|---|
| 3,636,430 | 1/1972 | Kernick et al. | 321/9 A |
| 3,648,150 | 3/1972 | Kernick et al. | 321/9 A |
| 3,670,230 | 6/1972 | Rooney et al. | 321/10 |
| 3,761,797 | 9/1973 | Spooner | 321/10 |
| 3,825,814 | 7/1974 | Pelly | 321/9 A |
| 4,053,820 | 10/1977 | Peterson et al. | 363/44 |
| 4,224,660 | 9/1980 | Mohan | 363/48 |
| 4,308,575 | 12/1981 | Mase | 363/48 |
| 4,327,319 | 4/1982 | Swisher et al. | 323/303 |
| 4,405,888 | 9/1983 | Wiart | 318/803 |
| 4,519,022 | 5/1985 | Glennon | 363/41 |
| 4,544,899 | 10/1985 | Townsend et al. | 333/17 |
| 4,731,722 | 3/1988 | Conroy | 363/44 |
| 5,072,200 | 12/1991 | Ranky | 333/167 |
| 5,162,983 | 11/1992 | Kumagai | 363/39 |
| 5,323,330 | 6/1994 | Ashlund et al. | 364/492 |
| 5,397,927 | 3/1995 | Suelzle et al. | 307/105 |

OTHER PUBLICATIONS

L. Gyugyi and E. C. Strycula, "*Active AC Power Filters*", Westinghouse Electric Corporation Research Laboratories, Pittsburgh, Pennsylvania, IAS '76 Annual.

*Primary Examiner*—William M. Shoop, Jr.
*Assistant Examiner*—Albert Paladini
*Attorney, Agent, or Firm*—Westman, Champlin & Kelly, P.A.

[57] ABSTRACT

An apparatus and method for reducing distortion currents present in an alternating current power system supplying power to a load which includes a passive filter and an active filter. In a first embodiment, the passive filter is operably connected to the power system across the load by a switching device. An active filter is then connected across the switching device and operated to draw a current equal to the current through the passive filter. The active filter and the passive filter are thereby connected in series across the load. The active filter is controlled to draw a fundamental frequency component and to provide distortion currents required by the load. In a second embodiment, the active filter is connected in parallel with a first circuit, the parallel combination of which is connected in series with a second circuit across the load. Besides providing distortion currents required by the load, the active filter is controlled to draw a current substantially in phase with the voltage across it in order to provide damping.

22 Claims, 7 Drawing Sheets

HYBRID FILTER FOR REDUCING DISTORTION IN A POWER SYSTEM

BACKGROUND OF THE INVENTION

The present invention relates to a system for reducing distortion present in an alternating current power system. More particularly, the present invention is a system and a method for reducing distortion in the alternating current power system using an active filter and a passive filter.

Alternating current (AC) distribution power systems operate most efficiently when a distortion free sine wave voltage is present. When an AC distribution power system has non-linear loads, typically distortion voltage and current are introduced. Attempts to correct the distortion voltage and current have included the use of both passive filters and active filters used by themselves or in combination. In passive filtration, a filter of fixed impedance is connected to the power system at or near the point of common coupling with a load. The passive filter provides a low impedance path for the distortion currents, thus bypassing them from entering the power system.

Significant drawbacks are present with this filtering technique. For example, since the passive filter is in parallel with the power system impedance, a resonance condition may result and could cause an over-voltage condition at the point of common coupling. In addition, besides "shunting" or "sinking" distortion currents generated at the point of common coupling, the passive filter further sinks currents generated elsewhere in the power system. Consequently, the power rating of the passive filter components must be increased to handle the additional current requirements.

Active filters have also been connected to the power system to reduce distortion on the power system. When active filters are used, distortion currents present at the point of common coupling are measured on the load side of the power system. Typically, the active filter includes a power electronic converter that either supplies or draws the distortion currents present at the point of common coupling so they are not present on the power system. However, since fundamental frequency voltage is present across the active filter, and since the distortion current can be significant in comparison to the fundamental frequency current, the power rating of the active filter must be high thus making this filtering technique quite expensive to implement.

Techniques have also been advanced wherein the passive filter and the active filter are connected in series, the combination of which being connected to the power system across the load. The passive filter passes the distortion current of the active filter to the power system and, at the same time, presents a relatively high impedance to the fundamental component of current such that the fundamental voltage is substantially across the passive element and not across the active filter.

Although in theory, use of the series connected passive and active filter arrangement provides the benefits discussed above, implementation is yet a different matter particularly when used on utility power systems where thousands of volts are typically present. If not connected properly, voltages and currents under transient conditions and startup could easily damage filter components.

SUMMARY OF THE INVENTION

An apparatus and a method for reducing distortion on an alternating current power system supplying power to a load are disclosed. In a first embodiment, the system includes a passive filter that it is operably connected to the power system across the load by a switching device. An active filter is then connected across the switching device and operated to draw a current equal to the current through the passive filter at the fundamental frequency. The active filter and the passive filter are thereby connected in series across the load. The switching device is then opened and the active filter generates distortion currents required by the load. Preferably, the passive filter is tuned to allow the distortion currents to pass through without developing a high voltage. With the active filter drawing the fundamental frequency current, the full-line voltage appears across the passive filter.

In a second embodiment, a circuit connected across the load includes a first circuit component and a second circuit component. The first circuit component, represented herein as an inductor, has a low impedance at the fundamental frequency and a high impedance at other frequencies. The second circuit component, represented herein as a capacitor, has a high impedance at the fundamental frequency and a low impedance at other frequencies. An active filter is connected in parallel with the inductor so that the voltage rating of the active filter is significantly reduced. However, since the series connected inductive circuit and capacitive circuit may interact with the impedance of the power system, possibly resulting in a series-resonance or a parallel-resonance condition, the active filter simulates a resistor and provides damping at the potential frequency of resonance. Specifically, the active filter is operated to draw a current component substantially in phase with the voltage across it at the frequency of resonance in addition to supplying the distortion current required by the load.

DETAILED DESCRIPTION OF THE PREFERRED EMBODIMENTS

Figure 1A:
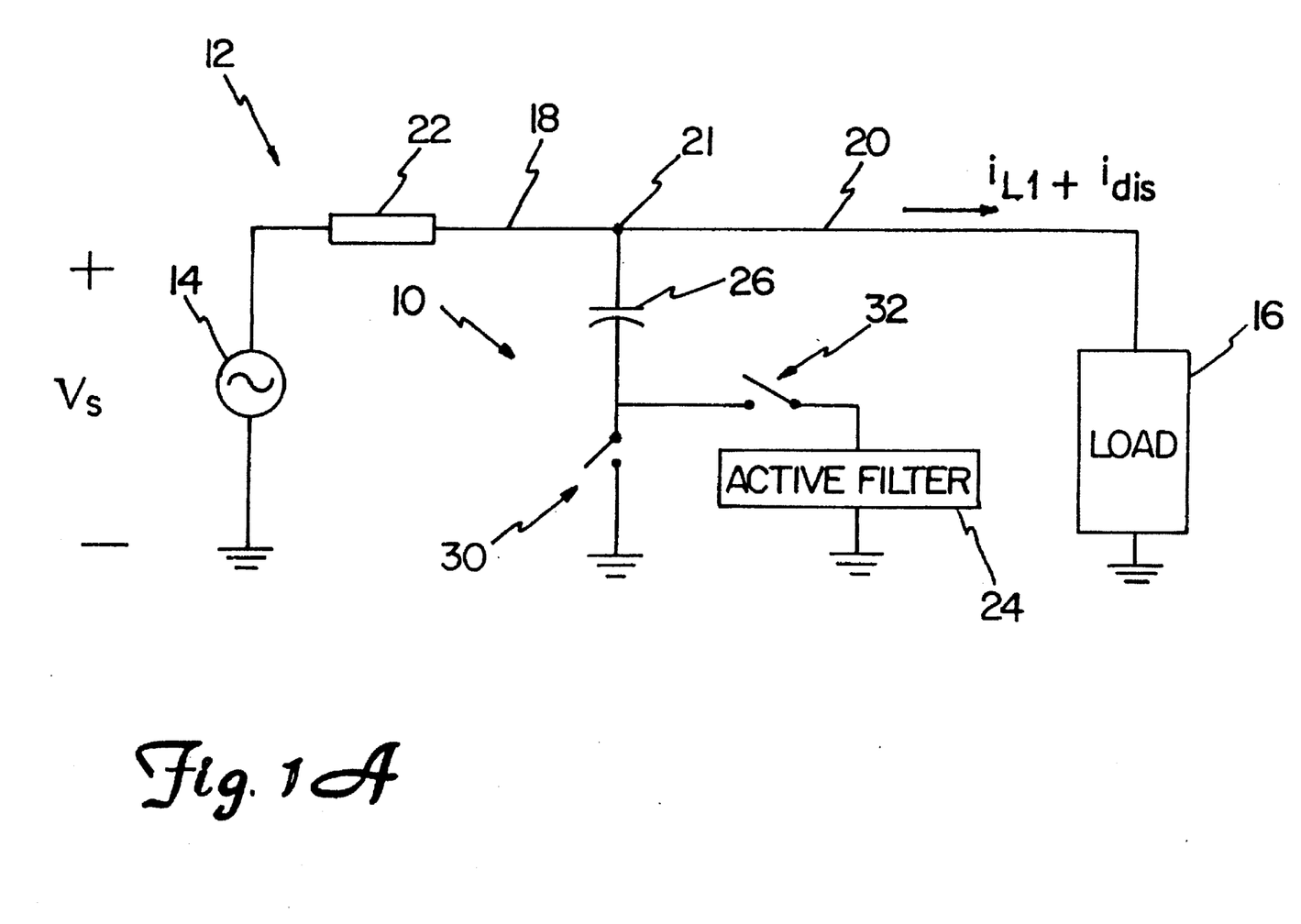
FIGS. 1A–1D are schematic representations of a first embodiment of the present invention for reducing distortion on a power system.

FIG. 1A schematically illustrates an active-passive filter circuit of the present invention generally at 10 and connected to a power system 12. The power system 12 includes a voltage source 14 connected to a load 16 through lines 18 and 20. The line 18 includes an impedance element 22 which is used to model the impedance of the power system 12 as seen from a terminal 21 toward the source 14.

The load 16 can be one of many circuits that cause distortion currents to flow in line 20. For instance, the load 16 can represent a conventional full-bridge diode rectifier to convert the alternating voltage source 14 to a direct voltage. Besides receiving a current, $i_{L1}$, with a frequency equal to the fundamental frequency of the voltage source, the load 16 draws a distortion line current $i_{dis}$. Typically, the distortion current $i_{dis}$ includes current components which include harmonics of the fundamental frequency. Other circuits such as inverters which convert a DC voltage to an alternating voltage are also well known causes of distortion current.

Figure 1B:
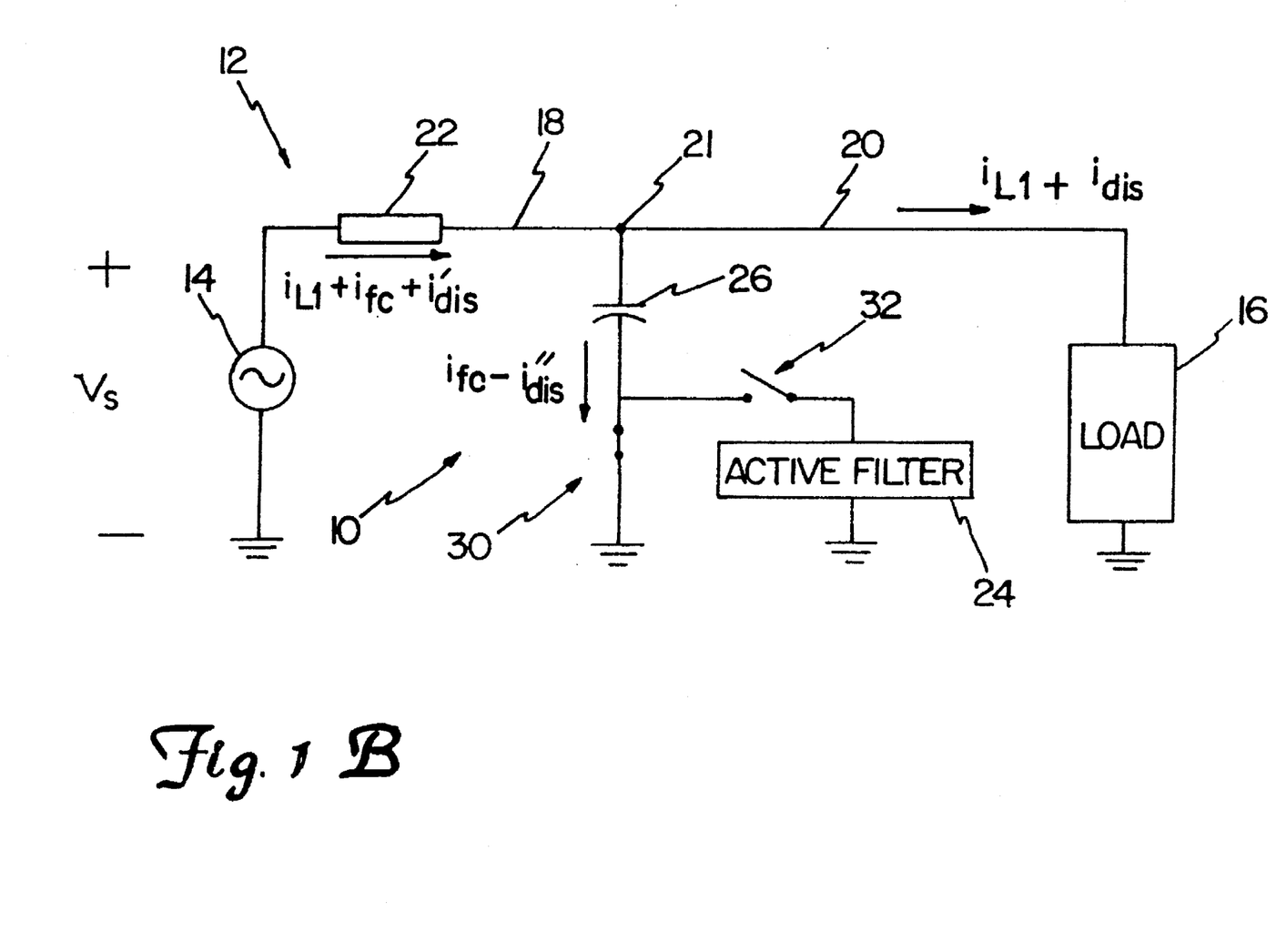

The active-passive filter circuit 10 of the present invention is connected to terminal 21 between the source 14 and the load 16. When operating in a manner as illustrated in FIG. 1D, an active filter 24 provides the distortion current $i_{dis}$ which flows through a passive filter 26 and to the load 16. At the same time, the active filter 24 is controlled to draw a current $i_{fc}$ at the fundamental frequency that flows through the passive filter 26. The function of the passive filter 26 is to substantially support the full-line voltage $v_s$ of the source 14 thereby preventing the active filter 24 from being exposed to this voltage, and thereby enabling the volt-ampere of the active filter 24 to be reduced. Preferably, the passive filter 26 is designed to have impedances at the frequencies of the distortion current $i_{dis}$ that are as low as possible in order to reduce the corresponding voltages and hence the volt-ampere rating of the passive filter 26.

The capacitive passive filter 26 exemplified in FIGS. 1A–1D requires a leading fundamental current to be drawn from the source 14 in order to drop the source voltage across it. When used on a utility system, such capacitance corrects the power factor of the line. When the load 16 is a high power converter, line power factor correction is typically needed.

The active-passive filter circuit 10 includes a first switching device 30 and, preferably, a second switching device 32. Referring to FIG. 1B, the first switching device 30 connects the passive filter 26 across the load 16 during initial start-up. Operating only with the passive filter 26, the full-line voltage from the source 14 is impressed across the passive filter 26 since the switching device 30 has substantially no impedance. The current flowing through the passive filter 26 and the switching device 30 is equal to $(i_{fc}-i''_{dis})$ wherein $i''_{dis}$ represents a substantial component of the distortion current $i_{dis}$ drawn by the load; $i'_{dis}$ represents a small component of $i_{dis}$ that flows through the voltage source; and $i_{dis}$ equals the quantity $(i'_{dis}+i''_{dis})$. At this time, the active filter 24 is either connected in parallel with the switch 30, but not operating, or is not connected through the use of the switching device 32.

Figure 1C:
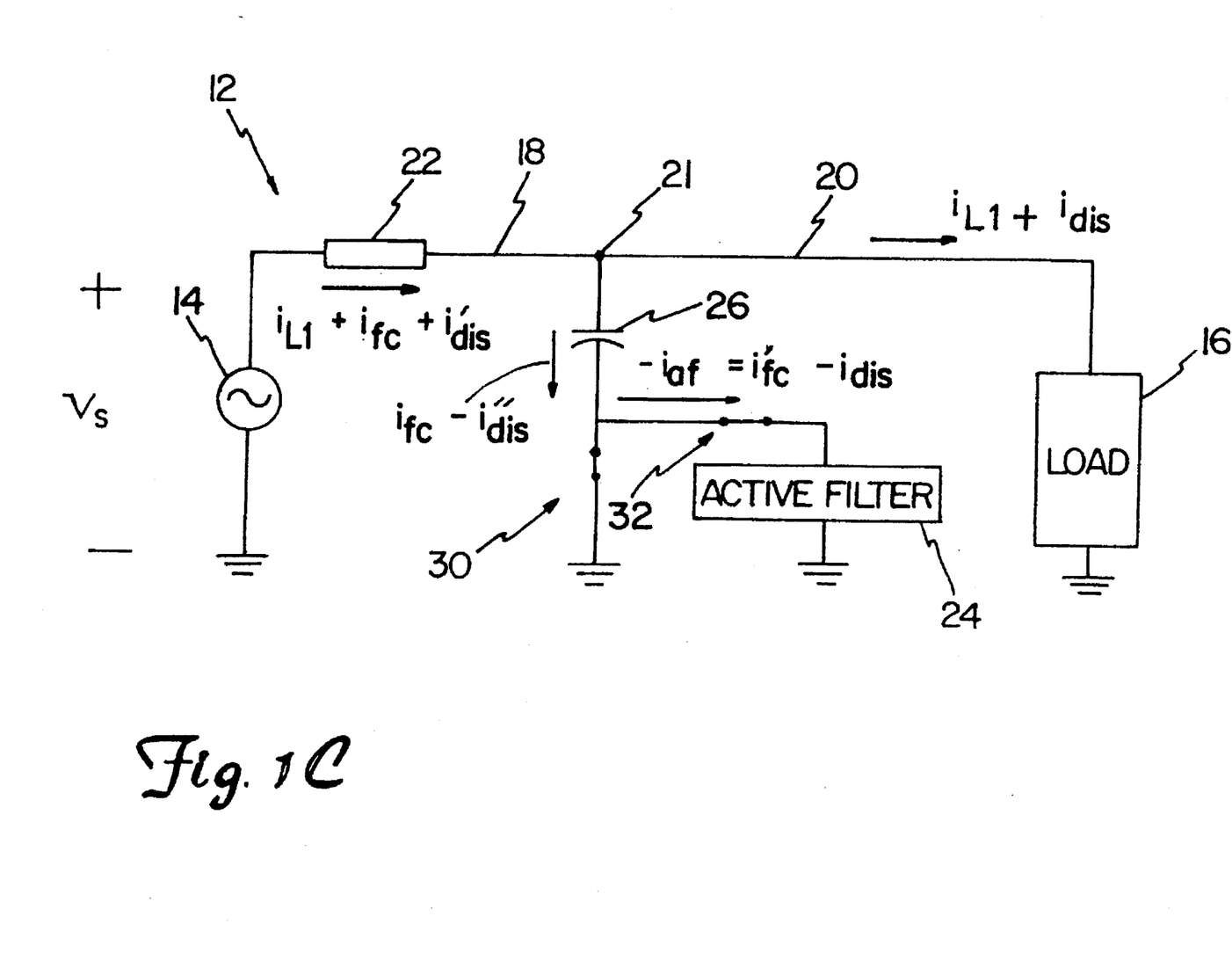
Figure 1D:
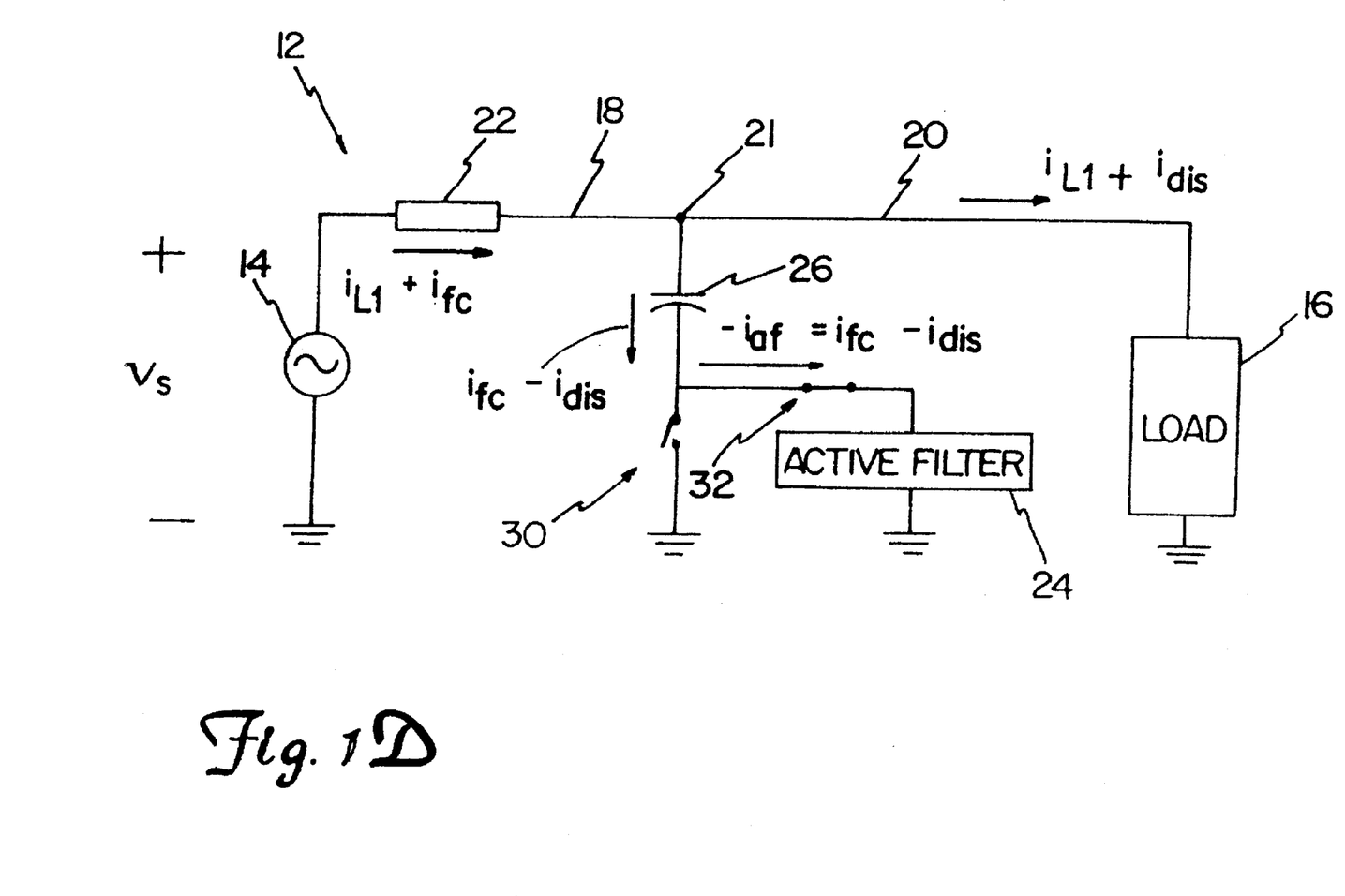

Next, as illustrated in FIG. 1C, the active filter 24 is controlled to draw a current substantially equal to the current $i_{fc}$ flowing through the passive filter 26, which thereby reduces the current through the switching device 30 to substantially zero. The fundamental frequency current component $i'_{fc}$ drawn by the active filter 24 may be slightly different than $i_{fc}$ because the control logic for the active filter 24 is based on an estimated value of the impedance of the passive filter. Also, the active filter 24 will draw a distortion current $-i_{dis}$, rather than $-i''_{dis}$, again, because of the control logic used. In other words, during this step of connecting the active-passive filter 10, the active filter 24 draws a current equal to $(i'_{fc}-i_{dis})$ which is slightly different than $(i_{fc}-i''_{dis})$.

Referring to FIG. 1D, the switching device 30 is then opened and the active filter 24 is operated to provide the distortion current $i_{dis}$ to the load 16. The current through the switching device 30 is essentially zero; and therefore, the switching device 30 can be opened without causing an arc. If the switching device 30 comprises back-to-back thyristors, then removing the corresponding gate pulses to the thyristors stops current conduction at the subsequent zero-cross. Once the switching device is opened, the active filter 24 is controlled such that the fundamental component drawn by it is $i_{fc}$. This will ensure that essentially zero fundamental frequency voltage appears across the active filter 24 and that no distortion current flows through the voltage source 14. It should be understood that implementation of the active-passive filter 10 through the steps discussed above and illustrated in FIGS. 1A–1D is quite fast on the order of one cycle at the fundamental frequency.

Figure 2:
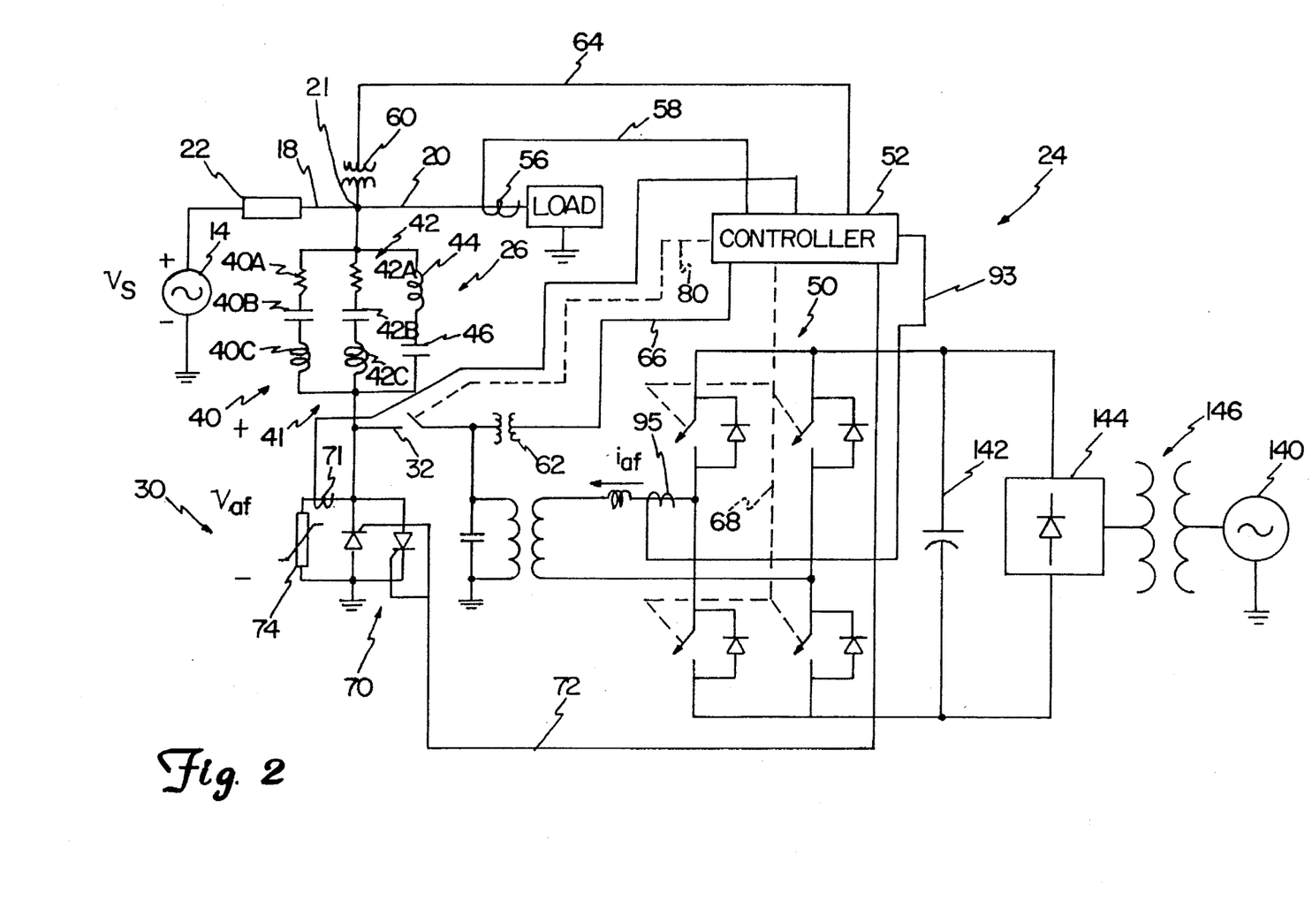
FIG. 2 is a schematic representation of the first embodiment in greater detail.

The active-passive filter circuit 10 of the present invention is illustrated in FIG. 2 in more detail wherein elements corresponding to those of FIG. 1 are identified by like reference numerals. As illustrated, the passive filter 26 comprises a plurality of tuned branch circuits 41. Preferably, the plurality of tuned branch circuits 41 include separate branch circuits tuned to prominent harmonic frequencies of the distortion current $i_{dis}$. For example, if the load 16 is a 12-pulse converter, it is well known that such a load draws a distortion current having current components which are harmonics of the fundamental frequency on the order of $12k\pm1$, where k=1,2,3,4 .... Assuming a 12-pulse converter load, a tuned branch 40 includes a resistor 40A, a capacitor 40B and an inductor 40C having values suitable for tuning the branch 40 to the eleventh harmonic frequency of the fundamental frequency of the voltage source 14. In a similar fashion, a tuned branch 42 includes a resistor 42A, a capacitor 42B and an inductor 42C that have values suitable for tuning the branch 42 to the thirteenth harmonic of the fundamental frequency of the voltage source 14. In addition, connected in parallel with the tuned branches 40 and 42 is an inductor 44 connected in series with a capacitor 46. The inductor 44 offers a negligible impedance to the distortion current $i_{dis}$, while preventing large in-rush (transient) currents at start-up. The capacitor 46 is provided as a low impedance path for other harmonics of the fundamental frequency of the voltage source 14 greater than the thirteenth harmonic.

FIG. 2 further illustrates that the active filter 24 generally includes a switched-mode inverter indicated at 50 and a controller 52. The controller 52 receives signals corresponding to the load current $i_L=(i_{L1}+i_{dis})$ (FIG. 1D), a signal corresponding to the voltage $v_t$ at the terminal 21, and the voltage across the active filter $V_{af}$. A current transformer 56 provides the signal proportional to the current $i_L$ along signal line 58, while potential transformers 60 and 62 are used, if desired, to provide signals corresponding to the voltages $v_t$ and $v_{af}$ along signal lines 64 and 66, respectively. The controller 52 controls operation of the switched-mode inverter 50 providing control signals along a signal line 68 in order to both draw the fundamental current $i_{fc}$ of the passive filter 26 as well as generate the distortion current $i_{dis}$ when the passive filter 26 is connected in series with the active filter 24.

Preferably, the controller 52 further controls the switching device 30. As embodied herein, the switching device 30 is a pair of back-to-back connected thyristors with gate pulses provided along a signal line 72. An arrester such as a metal oxide varistor (MOV) 74 is connected in parallel with the thyristors 70 and provides over-voltage protection. The controller 52 further controls the second switching device 32 along a signal line indicated at 80. The second switching device 32 is a mechanical switch, as illustrated, or could be a pair of back-to-back thyristors similar to the first switching device 30. In addition, the back-to-back connected thyristors 70 can be used to protect the MOV 74. If the energy being dissipated in the MOV 74 is above a certain critical level, as calculated from the instantaneous voltage $v_{af}$ provided by the potential transformer 62 and the current flowing through the MOV 74 as measured by a current transformer 71, the thyristors 70 can be turned on with suitable control signals provided by the controller 52.

Figure 3:
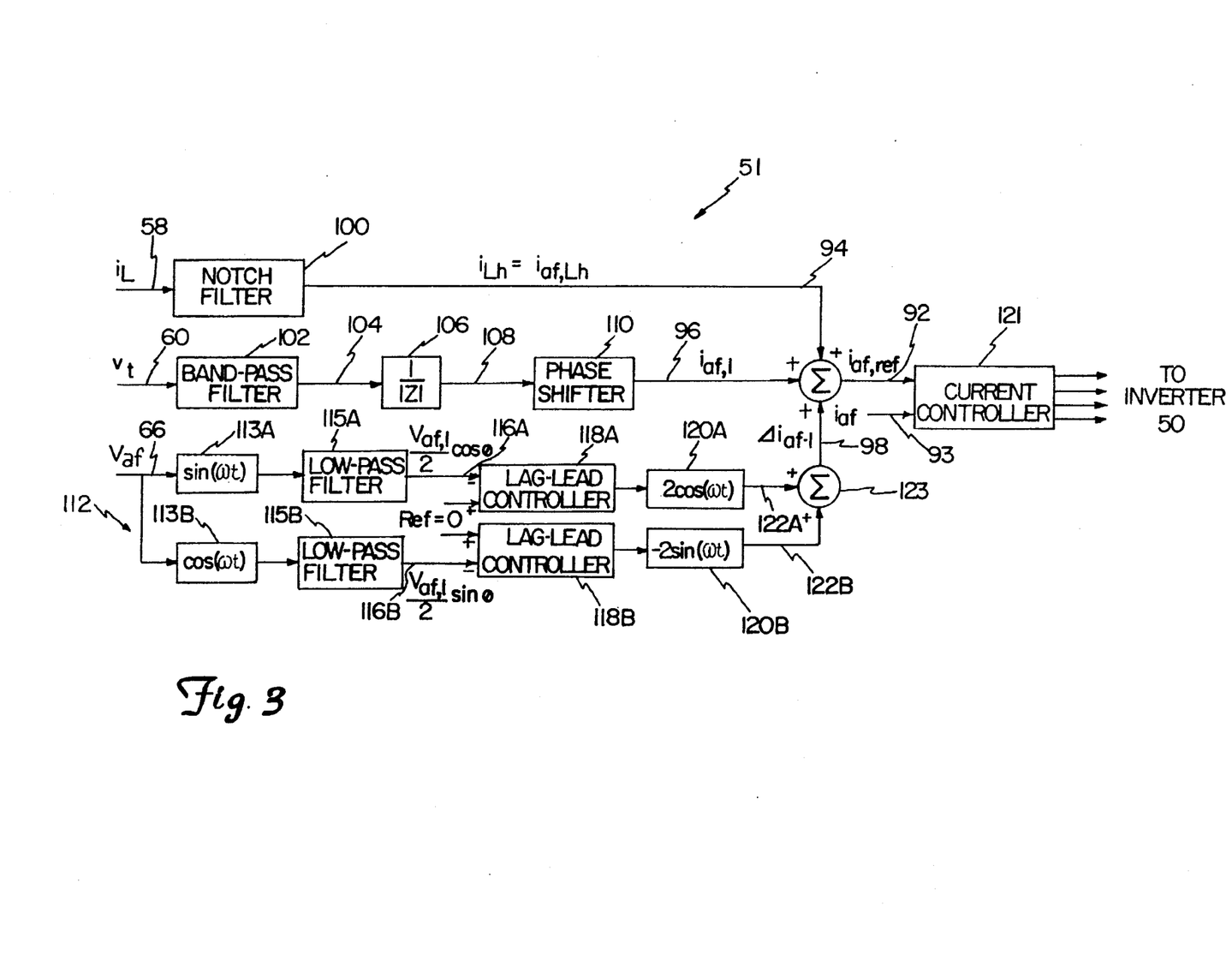
FIG. 3 is a schematic representation of a control circuit for controlling an active filter in the first embodiment.

An active filter controller 51 of the controller 52 is illustrated in the block diagram of FIG. 3. As stated above, the controller 52 receives measured values of the load current $i_L$, the terminal voltage $v_t$ and the voltage across the active filter $v_{af}$, which are provided to the active filter controller 51. The switched-mode inverter 50 is controlled to generate a current that is proportional to a reference current $i_{af\,ref}$ at signal line 92. The reference current $i_{af\,ref}$ is obtained from adding three component reference currents $i_{af\,Lh}$, at signal line 94, $i_{af\,1}$ at signal line 96, and $\Delta i_{af\,1}$ at signal line 98.

A filter 100 removes the fundamental frequency component from the current $i_L$ provided on signal line 58. The resulting reference current $i_{af\,Lh}$ on the signal line 94 thus represents the harmonic neutralizing part of the current generated by the active filter 24. Preferably, the filter 100 is a notch filter.

The reference current $i_{af\,1}$ represents the part of the active filter reference current $i_{af\,ref}$ which is used to maintain the fundamental component of the voltage across the active filter 24 at substantially zero. As illustrated, the voltage $v_t$ is applied to a filter 102 to realize essentially the fundamental frequency of the voltage $v_t$ at signal line 104. The fundamental frequency component of $v_t$ is applied to a gain circuit 106 that divides this voltage by an estimate of the impedance of the passive filter 26 at the fundamental frequency. An output signal from the circuit 106 is provided on a signal line 108 to a phase shifter 110. The phase shifter 110 provides phase correction using a phase angle of the impedance of the passive filter 26 at the fundamental frequency. Since the passive filter 26 is essentially capacitive at the fundamental frequency, the phase shifter 110 shifts the phase of the signal on signal line 108 by −90° to realize the reference current $i_{af\,1}$ on signal line 96.

The last component of the reference current $i_{af\,ref}$ is $\Delta i_{af\,1}$ which is introduced to take care of the errors made in estimating the impedance of the passive filter 26 at the fundamental frequency. A circuit 112 is used to minimize the voltage across the active filter 24 at the fundamental frequency. The error in estimating the impedance of the passive filter 26 at the fundamental frequency may cause a small finite component of voltage to appear across the active filter 24 at the fundamental frequency. In order to minimize this voltage, the voltage $v_{af}$ on signal line 66 is applied to gain circuits 113A and 113B which multiplies the voltage $v_{af}$ by the quantities $\sin(\approx t)$ and $\cos(\approx t)$, respectively. The resulting signals from gain circuits 113A and 113B are applied to corresponding low pass filters at 115A and 115B to realize signals at signal lines 116A and 116B that are proportional to:

$$\frac{v_{af1}}{2} \cos \phi \quad \text{(Quantity 1)}$$

$$\frac{v_{af1}}{2} \sin \phi \quad \text{(Quantity 2)}$$

wherein Quantity 1 represents the DC component of $v_{af}\sin(\omega t)$ and Quantity 2 represents the DC component of $v_{af}\cos(\omega t)$ and wherein $\phi$ is the phase angle of $v_{af,1}$. Each of the DC quantities on signal lines 116A and 116B are applied to corresponding lag-lead controllers 118A and 118B that compare these quantities to a preferred reference value of 0. Time varying gain circuits 120A and 120B receive the corresponding output signal from controllers 118A and 118B, respectively. The reference current component $\Delta i_{af\,1}$ is formed by combining the output signals on signal lines 122A and 122B from time varying gain circuits 120A and 120B with a summer 123. A current controller 121 provides control signals to the inverter 50 based on the reference current on signal line 92. The current controller 121 compares the reference current on signal line 92 to a signal on signal line 93 that is proportional to the actual distortion current of the active filter $i_{af}$ as measured by a suitable current transformer 95 (FIG. 2).

As indicated above, the switching device 30 is closed when the active filter 24 is controlled to draw the current $i_{fc}$ through the passive filter 26. The active filter 24 needs to circulate a current while the voltage across it ($v_{af}$) is zero due to the closed switching device 30. Therefore, unlike in the conventional active filter, a separate source indicated at 140 is provided to charge a DC capacitor 142 connected across the inverter 50. Preferably, a rectifier 144 and, if desired, an isolation transformer 141 are provided to convert the alternating voltage of source 140 to a DC voltage. Of course, source 140 may be obtained from the line voltage provided to the load 16.

Figure 4:
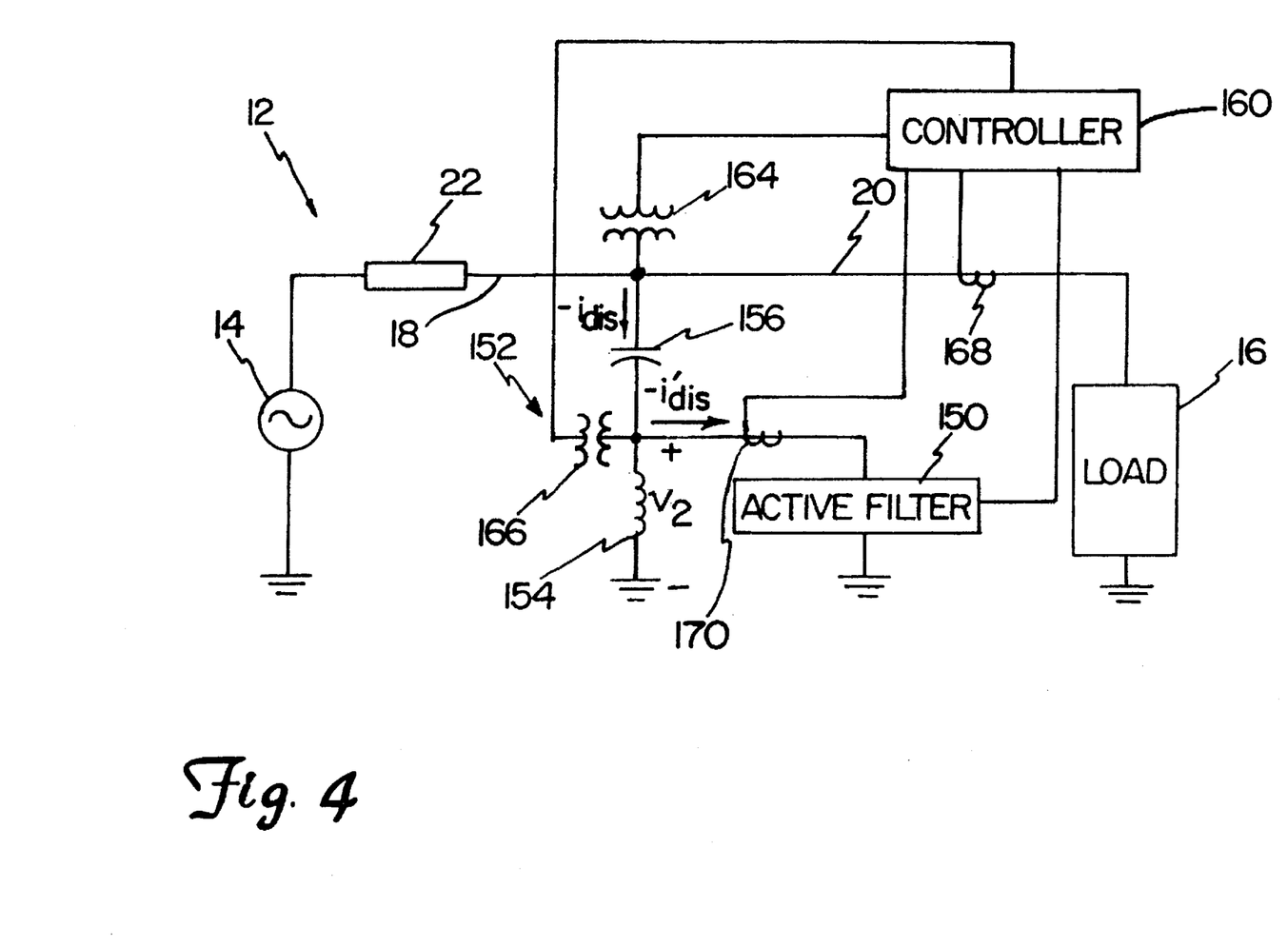
FIG. 4 is a schematic representation of another embodiment of the present invention for reducing distortion on the power system.

FIG. 4 illustrates a second embodiment of the present invention to reduce the volt-ampere rating of an active filter 150 connected to the system 12. As illustrated, a circuit 152 includes a first circuit component 154 and a second circuit component 156. The first circuit component 154, represented herein as an inductor, has a low impedance at the fundamental frequency and a high impedance at other frequencies. The second circuit component 156, represented herein as a capacitor, has a high impedance at the fundamental frequency and a low impedance at other frequencies. The active filter 150 is connected in parallel with the circuit component 154. In this manner, the voltage rating of the active filter 150 at the fundamental frequency is significantly reduced. However, the series connection of the first circuit component 154 and the second circuit component 156 may interact with the impedance 22 of the system 12, possibly resulting in a series-resonance or a parallel-resonance condition. In order to prevent such resonance, the active filter 150 is operated to provide damping at the resonant frequency in addition to supplying the required distortion current $i_{dis}$, as described above. The active filter 150 provides damping by simulating resistance at the resonant frequency. Specifically, the active filter 150 is operated to draw a current component in phase with the voltage $v_2$ at the resonant frequency. Of course, this will require that the active filter 150 be able to draw a small amount of real power from the system 12 at the resonant frequency. The active filter 150 is designed to be able to absorb this power on the DC side of the active filter 150.

A suitable controller 160 controls the active filter 150. The controller 160 receives signals proportional to the voltage across the load 16 and the voltage across the active filter 150 from potential transformers 164 and 166, respectively. A signal proportional to current drawn by the load 16 is provided by a current transformer 168, while a current transformer 170 provides a signal proportional to the current drawn and supplied by the active filter 150.

In summary, the active filter 150 of the second embodiment is operated such that it draws a distortion current component $(-i'_{dis})$ which causes all of the load distortion current $(i_{dis})$ to flow through the second circuit component 156. Thus, no distortion current flows through the voltage source 14. Also, the active filter 150 draws a current $(v_2/R)$ in phase with the voltage $v_2$ across it to damp any resonance condition.

Although the present invention has been described with reference to preferred embodiments, workers skilled in the art will recognize that changes may be made in form and detail without departing from the spirit and scope of the invention. For instance, the foregoing description has been in relation to a single-phase system; however, the basic principles are directly applicable to multiphase systems wherein the Figures would be one-line diagrams.

What is claimed is:

1. An apparatus for reducing distortion currents present in an alternating current power system supplying power to a load, the apparatus comprising:
   a passive filter operably connected to the power system across the load;
   an active filter; and
   switching means for selectively connecting the passive filter to the active filter to form a series combination, the switching means further operably connecting the series combination to the power system across the load.

2. The apparatus of claim 1 wherein the switching means includes a first switching device connected between the passive filter and the power system, and a second switching device connected between the passive filter and the active filter.

3. The apparatus of claim 2 wherein the first switching device comprises a thyristor.

4. The apparatus of claim 1 wherein the alternating current power system has a fundamental frequency and wherein the passive filter has an impedance at the fundamental frequency that is greater than an impedance at any harmonic of the fundamental frequency.

5. The apparatus of claim 1 wherein the power system comprises a multiphase alternating current power system.

6. The apparatus of claim 1 and further comprising:
   controller means for controlling current through the active filter;
   measuring means for measuring current through the passive filter, the measuring means providing an output signal to the controller means representative of the measured current; and
   wherein the controller means controls current through the active filter to be substantially equal to the current through the passive filter.

7. The apparatus of claim 6 wherein the controller means controls the active filter to draw a current at the fundamental frequency when the active filter is connected in series to the passive filter, the controller means further controlling the active filter to supply at least a portion of the distortion currents to the power system.

8. The apparatus of claim 7 wherein the active filter includes a source of power isolated from the power system.

9. The apparatus of claim 3 and further comprising:
   a thyristor connected in parallel with the first switching device; and
   means for measuring the energy dissipated by the thyristor and operating the thyristor if the energy dissipated is above a selected level.

10. An apparatus for reducing distortion currents present in an alternating current power system supplying power to a load, the apparatus comprising:
    a passive filter;
    an active filter;
    first switching means for selectively connecting the passive filter to the power system across the load;
    second switching means for selectively connecting the passive filter to the active filter to form a series combination, the second switching means further operably connecting the series combination to the power system across the load; and
    a controller connected to the first switching means and the second switching means to control the first switching means and the second switching means.

11. The apparatus of claim 10 wherein the first switching means comprises a thyristor.

12. A method for connecting a passive filter and an active filter across a load on an alternating current power system, the method comprising:
    connecting a passive filter across the load with a switching device and an active filter in parallel with the switching device; and
    operating the active filter to draw a current substantially equal to a current through the passive filter.

13. The method of claim 12 and further comprising connecting the passive filter in series with the active filter across the load.

14. The method of claim 13 wherein the switching device has an open position whereby substantially no current flows through the switching device, and wherein the step of connecting the passive filter in series with the active filter comprises operating the switching device to the open position.

15. The method of claim 14 and further comprising, after the step of connecting the passive filter in series with the active filter, measuring the voltage across the active filter and providing an input signal to the active filter proportional to the measured voltage, and wherein the step of operating includes drawing a current with the active filter as a function of the voltage measured across the active filter.

16. The method of claim 12 wherein the switching device comprises a thyristor.

17. An apparatus for reducing distortion currents present in an alternating current power system supplying power to a load, the alternating current power system having a fundamental frequency, the apparatus comprising:
    a first circuit having an impedance at the fundamental frequency that is greater than an impedance at any harmonic of the fundamental frequency;
    a second circuit having an impedance at the fundamental frequency that is less than an impedance at any harmonic of the fundamental frequency; and
    an active filter connected in parallel with the second circuit, the active filter drawing a current substantially in phase with a voltage at a selected frequency and providing a distortion current to the load.

18. A method for reducing distortion currents in an alternating current power system supplying power to a load, the alternating current power system having a fundamental frequency, the method comprising:
    connecting a circuit to the power system, the circuit comprising a first circuit component having an impedance at the fundamental frequency that is greater than an impedance at any harmonic of the fundamental frequency connected to a second circuit component having an impedance at the fundamental frequency that is less than an impedance at any harmonic of the fundamental frequency, and an active filter connected in parallel with the second circuit component; and
    operating the active filter to draw a current substantially in phase with a voltage at a selected frequency.

19. The apparatus of claim 17 wherein the selected frequency is a resonant frequency.

20. The apparatus of claim 17 wherein the first circuit includes a capacitor and the second circuit includes an inductor.

21. The method of claim 18 wherein the selected frequency is a resonant frequency, and wherein the step of operating includes supplying a distortion current to the load.

22. The method of claim 18 wherein the first circuit includes a capacitor and the second circuit includes an inductor.

* * * * *